No. 693,835. Patented Feb. 25, 1902.
H. CAMPBELL.
METHOD OF HEATING MATERIAL.
(Application filed May 22, 1901.)
(No Model.) 2 Sheets—Sheet 2.
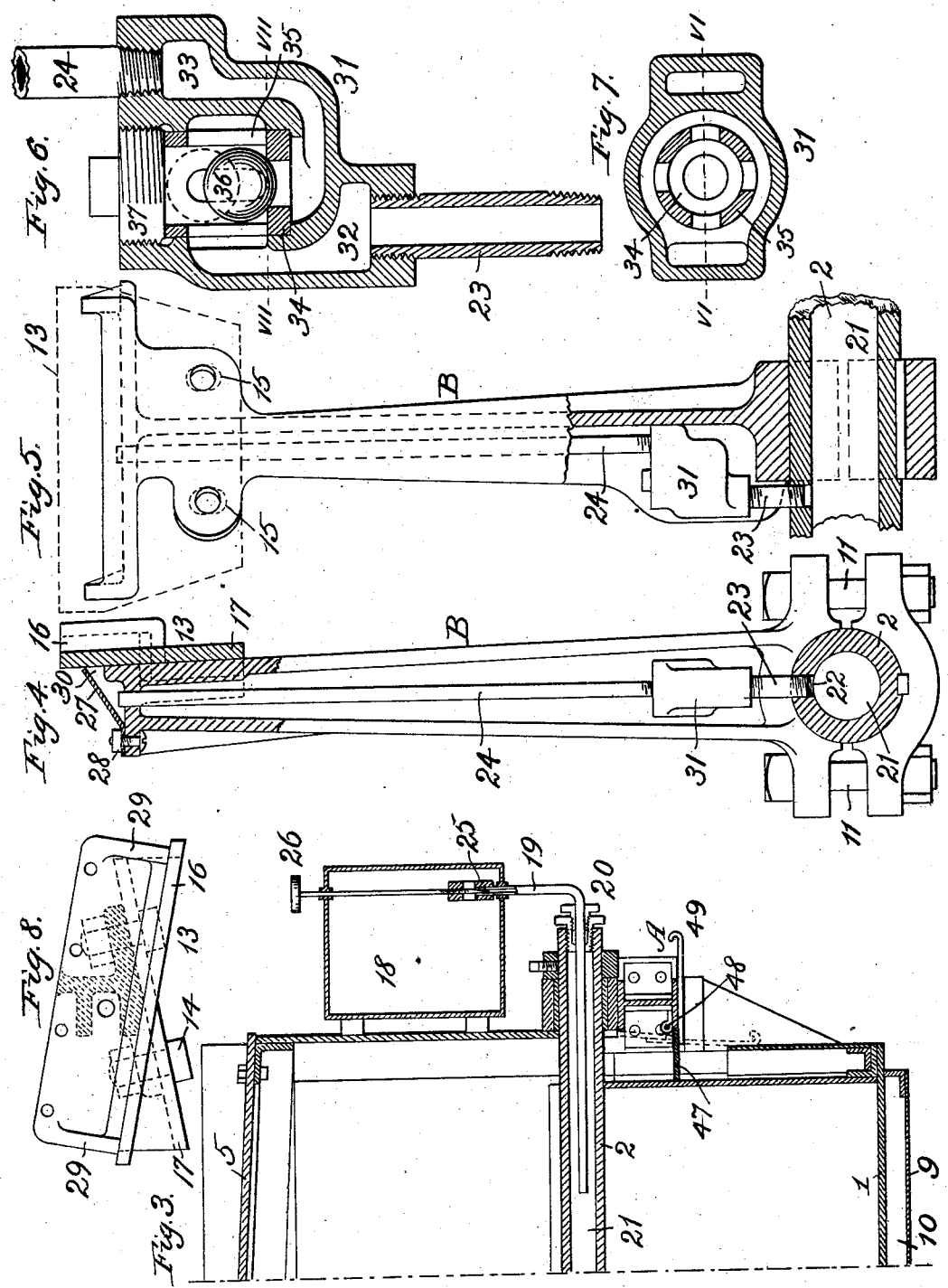

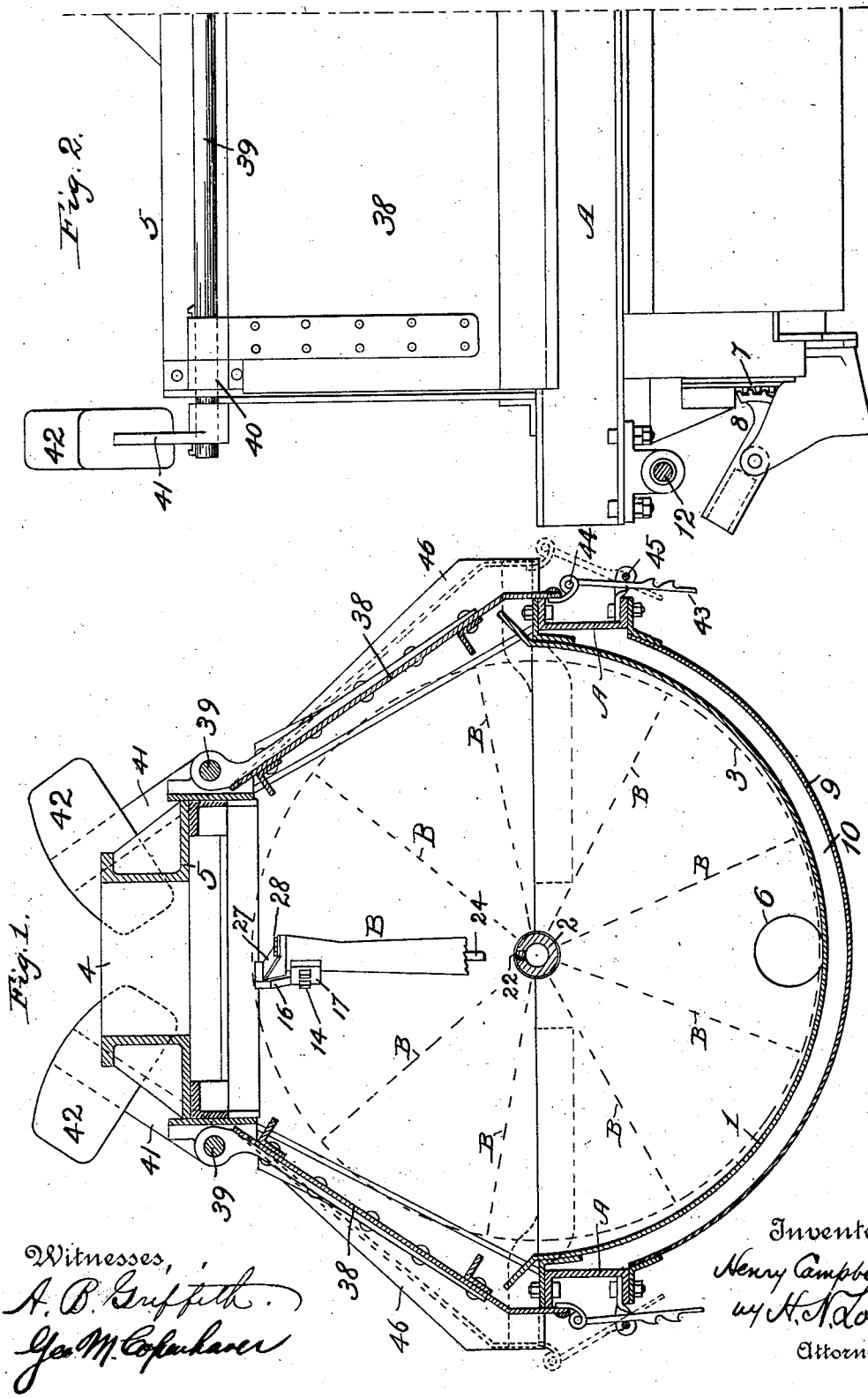

UNITED STATES PATENT OFFICE.

HENRY CAMPBELL, OF BALTIMORE, MARYLAND.

METHOD OF HEATING MATERIAL.

SPECIFICATION forming part of Letters Patent No. 693,835, dated February 25, 1902.

Application filed May 22, 1901. Serial No. 61,437. (No specimens.)

*To all whom it may concern:*

Be it known that I, HENRY CAMPBELL, a citizen of the United States, residing at Baltimore city, in the State of Maryland, have invented certain new and useful Improvements in Methods of Heating Materials; and I do declare the following to be a full, clear, and exact description of the invention, such as will enable others skilled in the art to which it appertains to make and use the same.

My invention relates to the drying or heating and mixing of materials and compositions, and comprises a process or method of procedure.

The invention is especially applicable to the treatment of materials for paving—such as asphalt, rock-asphalt, sand, rock, and gravel—but is capable of wide application in the arts wherever the drying or mixing of materials under heat, to which my invention is suited, is to be accomplished.

Taking, for example, the treatment of rock or natural asphalt according to my invention, I take a suitable quantity of the pulverized rock and cause a flame or flames from the combustion of oil, gas, or other fluid fuel to pass down into and laterally through the material, while the asphalt is at the same time mechanically stirred and mixed. This procedure is continued till the material is at a heat of 300° to 350° Fahrenheit. When desired, sand or other material may be added to the asphalt and mixed therewith in the process of passing into and through the same the flames, as above described. When it is desired to quickly, thoroughly, and evenly heat to a high temperature a mass of sand, I may follow the same method till the sand has become nearly red-hot and evenly heated throughout, the degree of heat depending on the quantity of sand, the amount of fuel employed, and the length of treatment. In order to enable the heating-flames to be passed thoroughly into every part of the mass of material or composition being treated and at the same time mix the latter to a homogeneous condition, I provide mixing arms or devices adapted to be passed down into and through the material and feed to the stirring or mixing extremities of such devices a suitable fluid (liquid or gaseous) fuel, such as a volatile oil, in such quantity and manner that flames are caused to burn on the stirring devices and are carried thereby into and laterally through the material, heating every part of it. As a further improvement I provide for guarding the burner-orifices, so that they shall not become clogged by the material. I also provide for regulating the supply of air to the material as may be necessary to insure proper combustion of the fuel, also for cutting off or diminishing the supply of fluid fuel to each stirring device when it is elevated out of reach of the material. As a further improvement in connection with such flame-carrying stirring-arms I supply in any suitable manner a surplus quantity of volatile oil to the material, (beyond what is required for feeding the stirring-arm flames,) which will burn over the surface of the material, will be ignited from time to time by the flames carried by the arms, and will ignite the fluid fuel issuing from any burner-orifice when the flame of the latter has become extinguished.

In order to make my invention more clearly understood, I have shown in the accompanying drawings means for carrying the same into practical effect without limiting my improvements in their useful applications to the particular constructions which for the sake of illustration I have delineated.

In said drawings, Figure 1 is a transverse vertical section of so much of a heating and mixing apparatus as is necessary for an understanding of my invention. Fig. 2 is a side view of one end of the same. Fig. 3 is a longitudinal vertical sectional view of a portion of the other end of the same. Fig. 4 is an elevation, partly in section, of one of the stirring devicea or arms looking in a direction transverse to the plane of rotation. Fig. 5 is a similar view looking in a direction parallel with the plane of rotation, the stirring or mixing paddle being removed and indicated in dotted lines. Fig. 6 is a sectional view of the fluid-fuel-controlling valve on line VI, Fig. 7. Fig. 7 is a sectional view of the same on line VII, Fig. 6. Fig. 8 is an outer end view of one of the stirring devices.

Referring to the drawings, A is the frame of the machine, which may be mounted on wheels in a well-known manner or may be stationary. 1 is the mixing-pan, carried on said frame. It is of such contour that the outer ends of the stirring devices carried by the rotary shaft 2 and following the path 3, Fig. 1, shall pass close to its bottom, but shall clear its sides and upper edges by a greater space. To this pan the material is supplied as required through an opening 4 in the top 5 and when heated, mixed, or melted is delivered through a discharge opening or spout 6, closed by a gate 7. The latter may be operated by a rack and gear 8 in a well-known manner. To conserve the heat in the pan, the latter is inclosed by an outer bottom 9, forming an air-space 10. The stirring or mixing devices B are clamped on the shaft 2 by bolts 11 and arranged along and around said shaft at proper intervals—for instance, about six and one-half inches apart longitudinally and about forty degrees apart circularly and preferably helix fashion; but this spacing and arrangement admits of wide variation, according to the nature of the material to be treated and degree to which it is to be stirred, mixed, and heated.

Rotary motion is imparted to the mixing-shaft 2 from a transverse power-shaft 12, which latter may be connected with the shaft 2 by gearing of well-known character and is itself driven by hand or by power mechanism.

The stirring devices or arms B are or may be constructed as best shown in Figs. 4, 5, and 8, preferably of cast metal. Each arm carries a paddle 13, secured by bolts 14, so as to be slightly adjustable radially to enable the paddles to be set close to the bottom of the receptacle 1. This adjustment may be effected by slots 15, formed in the paddle, Fig. 5. Each paddle has two oppositely-inclined blades 16 and 17, the one being adapted to gradually force the material toward the delivery-opening 6 and the other adapted to give a rotary motion to such material with a view to shift and thoroughly mix the different parts of the charge which is being treated. The motion given to the material by the outer blade 16, however, somewhat predominates over the backward motion given by the blade 17, whereby a gradual or constant feed of the material toward the opening 6 is effected.

The preferred means for delivering the fluid fuel to the extremities of the stirring devices B is as follows: 18 is a tank for volatile oil secured to the apparatus at a convenient situation and height, from which an oil-pipe 19 enters the end of the hollow shaft 2 through a suitable stuffing-box 20 in such manner as to deliver the fluid fuel to the chamber 21 of said shaft without interfering with the rotary motion of the latter. From the shaft 2 the fuel passes through openings 22 into and through a conduit 23 24 to a point at or near the outer extremity of the stirring devices B, where it is delivered in such manner that the oil or the vapor therefrom shall burn during the actuation of the stirring devices. The feed of the fluid fuel from the tank 18 is controlled by a needle-valve 25 through a handle 26. In order to prevent the clogging of the outer opening of the duct 24, the same is guarded by a plate 27, bolted at 28 to the arm B. This plate, together with end flanges 29, forms a chamber 30, in which the volatile oil may be more or less vaporized, the combustion of the fluid fuel taking place around the edges of the plate 27 in such manner as to produce a considerable area of flame and heating-surface. The material is thus not only heated directly by the flames, but the stirring-arms B are considerably heated and in turn impart their heat to the material in passing through it.

At a suitable point between the shaft 2 and what may be termed the "burner" I interpose a controlling means or valve for limiting or regulating the supply of fluid fuel through the ducts 23 24. As illustrated, this consists of a casing 31, into which the ducts 23 and 24 are fitted, the former communicating with a chamber 32 and the latter with a chamber 33. Between said chambers is interposed a valve-seat 34, the latter preferably constituting a part of a cage 35, which is fitted within the casing 31. In said cage operates by gravity a ball-valve 36 in such manner that when the stirring device is extending upward out of or above the material to be treated the ball 36 will rest upon the seat 34 and cut off wholly or partially the flow of fuel from the chamber 32 to the chamber 33. When the stirring device B descends to and into the material, the ball-valve will by gravity occupy the position shown in dotted lines, Fig. 6, and leave a free passage for the fuel from the chamber 22 of the rotary shaft to the extremity of the stirring device.

37 is a screw-plug which closes the opening of the casing 31, through which the cage and ball are inserted, adjusted, and inspected for cleaning or other purpose.

I further provide for regulating access of air to the interior of the mixing-chamber. For this purpose I employ dampers 38, extending for more or less of the full length of the machine along the sides of the upper portion of the mixing-chamber. Each damper is fixed on a longitudinal shaft 39, which is mounted in bearings 40 on the top 5 of the machine.

41 is a lever-arm carrying a weight 42 and fixed on the shaft 39 in such manner as to counterbalance the weight of the damper 38 and render the latter easily adjustable. This adjustment is conveniently effected by braces 43, hinged at 44 to the damper and adapted to rest upon, when the damper is raised, a stop 45, fixed on the frame A. At each end of the damper is a transversely or outwardly extending wing 46, fixed on the frame of the machine and adapted to practically close the space at the end of the damper, exclude drafts of air, and limit the access or feed of the air to the space left along the lower edge of the damper. The products of combustion pass out through the opening 4, which may communicate, if desired, with a suitable flue or stack.

For the more thorough feeding of air to the interior of the mixing or combustion chamber of the machine I may also employ end dampers, as indicated at 47 in Fig. 3. These dampers may be arranged one at each end of the machine to close or open the vertical space between its inner and outer walls, and thus cut off or admit air therethrough to the pan 1. The damper 47 is shown as hinged at 48 and provided with a handle 49, by which it may be turned into the closed position (shown in full lines) or the open position. (Shown in dotted lines.)

It will be understood that my invention may be carried into effect in an apparatus in which the pan is a closed rotary cylinder having stirring means with or without stationary arms or with rotary oil-feeding arms or burners carried with the cylinder.

I am aware that it has been proposed to treat refractory ores by projecting a flame through falling particles of such ores and to burn cement by introducing a flame into a rotary cylinder, in which the material to be calcined is caused to slowly descend, and I do not wish to be understood as claiming such procedures.

I am also aware that the combustion of material, such as garbage, has been proposed by causing flames or blasts of flames to impinge upon the material; but this is to be distinguished from my invention, which treats a material entirely different from garbage and is distinctively not a combustion, but a heating, process. Moreover, the causing of a gradual, alternate, and repeated approach and recession of a flame toward and from the material while the material is agitated is to be distinguished from proposed methods of combustion (as in the patent to Anderson, No. 526,283, for burning garbage) in which blasts of flame are caused by their velocity to continuously penetrate and consume the refuse, and I do not claim such latter procedure. The continuous and strong blasts of flame therein employed are unsuited to the purposes of my process or entirely destructive of them, whereas the gradual, alternate, and repeated carrying of the flame toward and from or into and out of contact with the material while the latter is being mixed attains a thorough and rapid but not destructive heating and preparation of the material for subsequent use in the manufacture of pavements, &c.

I do not herein claim the apparatus set forth, the same being the subject of my application, Serial No. 71,499, filed August 9, 1901.

What I claim is—

1. In the art of heating material, such as asphalt or sand, the herein-described method which consists in gradually and repeatedly passing flames bodily into and through the mass of the material, and at the same time stirring the material.

2. In the art of heating material, such as asphalt or sand, the herein-described method which consists in gradually and repeatedly passing flames bodily into and through the mass of the material, and at the same time stirring the material and admitting a regulated quantity of air thereto.

3. In the art of heating material, such as asphalt or sand, the herein-described method which consists in supplying to the material in direct contact therewith a volatile oil, gradually and repeatedly passing flames bodily into and through the mass of material, and at the same time stirring the material and causing the combustion of said oil.

4. In the art of heating material, such as asphalt or sand, the herein-described method which consists in inclosing the material, supplying thereto in direct contact therewith a volatile oil, gradually and repeatedly passing flames bodily into and through the mass of the material and at the same time stirring the material and causing the combustion of said oil, and admitting a regulated amount of air to the material.

5. In the art of treating asphalt, the herein-described method which consists in increasing its softness and plasticity by gradually and repeatedly passing a flame bodily into and through the mass of the asphalt, and at the same time agitating the asphalt.

In testimony whereof I have signed my name to this specification in the presence of two subscribing witnesses.

HENRY CAMPBELL.

Witnesses:
JOHN THIEL,
A. J. JONES.